United States Patent [19]
Fields

[11] Patent Number: 5,148,774
[45] Date of Patent: Sep. 22, 1992

[54] LITTER BAG FRAME

[76] Inventor: Walter G. Fields, 19 Village La., Middletown, N.J. 07748

[21] Appl. No.: 862,616

[22] Filed: Mar. 30, 1992

[51] Int. Cl.⁵ .............................................. A01K 29/00
[52] U.S. Cl. ................................................... 119/165
[58] Field of Search ............... 119/165, 166, 167, 168, 119/169, 170; 220/403, 908

[56] References Cited

U.S. PATENT DOCUMENTS

| | | | |
|---|---|---|---|
| 3,890,930 | 6/1975 | Clark | 119/169 |
| 4,788,935 | 12/1988 | Balla et al. | 119/168 |
| 4,913,091 | 4/1990 | O'Connor | 119/170 |
| 4,919,078 | 4/1990 | Morrison | 119/170 X |

*Primary Examiner*—Gene Mancene
*Assistant Examiner*—Thomas Price
*Attorney, Agent, or Firm*—Charles F. Gunderson

[57] ABSTRACT

A framework, of the general size and shape of an enclosed litter box, is designed to fit within a plastic bag of a comparable size and shape, so that it can rest on its side on the floor to provide a litter box. The framework may be of solid panels, or open mesh, or even wire forming the necessary shape. However, it must form the bag into a top, sides, rear, and bottom sections, with an open front section adjacent to the opening of the bag. While the top, sides and even the back of the framework may be solid, the bottom must be open so that the plastic surface of the bag along the bottom can be covered with litter to accommodate its proscribed function. The front must also be open to allow an animal to enter through the opening of the bag. The entire structure may be fit into a shallow pan that can support the bottom of the bag containing the litter and hold the framework above the litter. When the litter is exhausted, the frame can be removed from the bag—which can be discarded—and fit into a new plastic bag.

8 Claims, 1 Drawing Sheet

LITTER BAG FRAME

BACKGROUND OF THE INVENTION

Pets are an integral part of our society, and pet owners must learn to cope with the inevitable problems of animal husbandry as far as domestic pets are concerned. Animals require nourishment, of course, and produce waste. Feeding an animal is a minimal problem, but animal waste causes many problems. Idealy, the animal can be exercised outside of the home, but even outside, "scoopers" of one kind or another may be required or should be used. These are readily available, and of inumerable types, including some disposable types.

However, walking an animal, in a timely manner, is not always possible. In fact, while dogs can be walked, and very much enjoy the air and exercise, cats do not adapt to the same pattern. Stray cats are quite happy on the streets, but domestic cats must not, or should not, be let out; particularly in urban areas. Consequently, other arrangements must be made for indoor waste collecting and disposal.

Fortunately, cats adapt to litter boxes, which, therefore, are a very necessary element in providing for animals, and in particular, cats, that must be kept indoors. With a combination of natural instinct and training, kittens and cats can learn to use a litter box, which, very effectively, provides a control of and reduces rather unsavory messes and odors in the home.

Litter boxes can be anything from a simple flat pan or tray, somewhat larger than the cat, with sides to contain the litter material, to elaborate boxes forming a roof over the tray, with an opening in one end for a cat to enter. These may be, psychologically more attractive to animals, as well as to pet owners, and do contain the inevitable odors to some extent.

However, the larger and more elaborate the litter box, the more awkward it becomes to find a place for it, or to carry it from place to place, or store it when it is not in use. The more elaborate litter boxes can be quite heavy and cumbersome.

Almost all of these litter boxes are provided with a layer of sand, or one of many types of commercial litter material that may be treated with a chemical or deodorant of one kind or another to absorb the animal fluids and droppings, and contain the odors.

In any and all cases, the box, and its litter must be emptied quite often, and the box and its tray must be cleaned from time to time for obvious reasons. This chore is as unpleasant as it is necessary.

It is an object of this invention to provide a disposable bag that is an integral part of a domestic litter box. The bag, logically of plastic, can be fit over a frame to surround and form the litter box itself, which is completely enclosed, except for an entrance at one end, which is, of course, the opening of the plastic bag. The litter material can be spread over the bottom of the plastic bag to attract the cats. There the litter is available for use, and for timely disposal with a minimum of effort and inconvenience.

It is a further object of this invention to provide a frame that can fit into a plastic bag to form an enclosed litter box; open at one end, but with sides, top and bottom completely sealed by the plastic. This frame and litter box can be easily moved from room to room. The plastic bag can be easily discarded and replaced. The frame may be cleaned, if necessary, and folded and stored for future use.

The frame and plastic bag may be fit into and be attached to a conventional litter tray, but the litter material is spread out on the plastic inside of the bag instead of on the tray. This provides a lighter, simpler, more sanitary, portable, and disposable litter bag; serving as a litter box for the use of domestic pets domestic pets.

SUMMARY OF THE INVENTION

A hollow framework is designed to fit within a plastic bag of comparable size. The framework may be solid or open, with sides, top, and even a back section, but it must be open along the bottom, where one side of the plastic bag will hold a layer of litter material, and at one end, which is the open end of the plastic bag, to provide an entry for the animal. The framework may rest on or be secured to a base, in the form of a tray, but its lower edge must be separate, or separable, from the tray so that the plastic bag can be pulled over the frame. However, as noted, its open end must be suitable for the entry and exit of animals using this liter box. The plastic lining of the bag along the bottom of the tray should be covered with absorbent litter of any well known kind to function in its well known manner. After a given interval of use, the framework may be removed from the base, and pulled out of the plastic bag, which can, then, be discarded and replaced by another plastic bag.

DETAILED DESCRIPTION OF THE INVENTION

Figure 1:
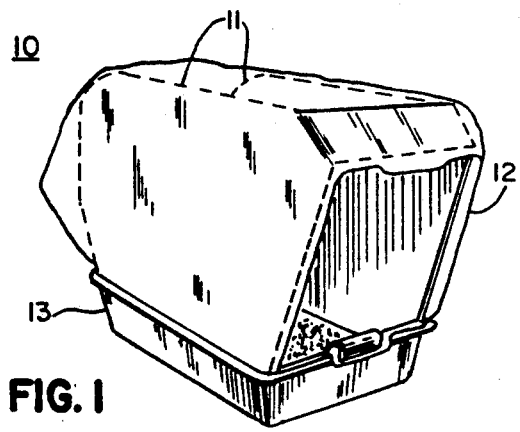
FIG. 1 is an isometric view of one embodiment of this invention.

Referring now more particularly to FIG. 1, an isometric view is shown of a typical embodiment 10 of this invention. This shows, mainly in doted lines, a frame 11 supporting a plastic bag 12. The frame is fitted onto, and supported by the base tray 13. The frame and the open end of the plastic bag provide an opening for the entrance and exit of an animal.

Figure 2:
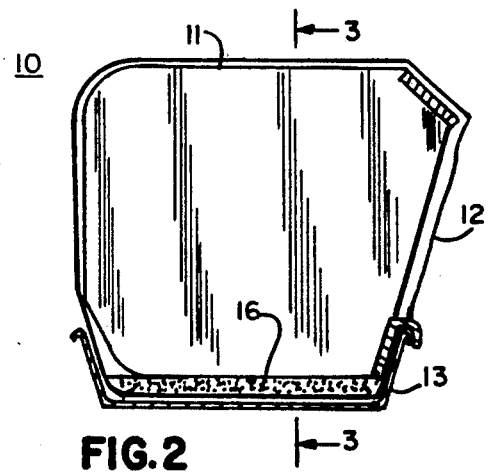
FIG. 2 is a side view of this embodiment in cross section

FIG. 2 shows a side view of the same litter bag in cross section through the center of the device. Here, as in all of the drawings, similar elements are similarly numbered. This shows more clearly the frame 11 that supports the plastic bag 12 in an open condition to function as a litter box. The base tray 13 is seen supporting the frame, at one end, and litter 16 is seen spread out over the side of the plastic bag 12, that is resting along the bottom of the base pan 13.

Figure 3:
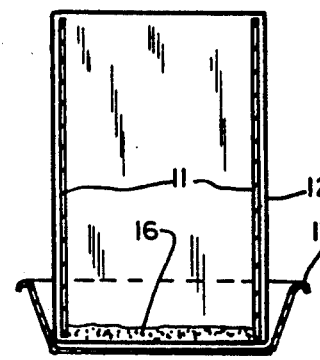
FIG. 3 is an end view, also in cross section, along the lines 3—3 of FIG. 2

FIG. 3 shows an end view of the same device, also in cross section, along the lines 3—3 of FIG. 2. This shows, again, the potential height of the bag 12, wrapped around the frame 11. The litter, 16 is spread over the plastic 12 in the bottom of and within the base of the tray 13.

Figure 4:
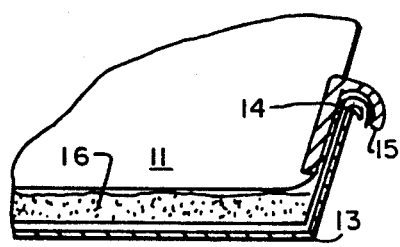
FIG. 4 is an enlarged cross section of a side view of the open end portion of this embodiment.

FIG. 4 shows an enlarged cross section of a portion of the base tray 13, supporting the frame 11. In this embodiment, the frame may have a notch in the base of the lower corner of its forward end, that rests, on top of the plastic 12, against the forward edge of the base tray 13. A top portion of the notch has a projection 15 that engages the lip 14 of the forward edge of the base tray to hold the frame parallel to, but just above the bottom of the base tray. The bottom of the plastic bag, and the litter are shown just below the bottom of the frame.

In this species of this invention, the frame, along with the plastic bag and litter, is removable by lifting the frame, with its notch and projection 15, off its position on the upper lip 14 of the front edge of the base tray. The frame can be pulled out of the bag 12 and fit into another bag to provide, in effect, a new litter box/bag.

In other variations the frame can be bolted to, or otherwise secured to the tray, and the plastic bag can also be slid on or off of the frame without removing it from the base of the tray. This is facilitated when the lower sides of the frame are held well above the litter material in the bottom of the tray that will, predictably, become soiled at some time.

Figure 5:
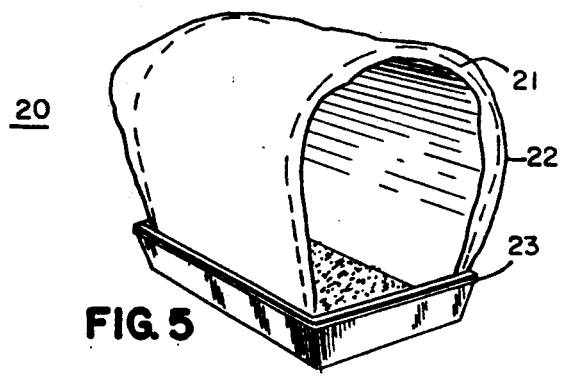
FIG. 5 is an isometric view of another embodiment of this invention.

FIG. 5 is an isometric view of another embodiment 20 of this invention wherein the frame 21 consists of a flexible sheet of plastic or metal that can be bent into a semi-tubular form to fit inside the plastic bag 22. This whole assembly can be fit into a base tray 23 to engage securing brackets, as will be seen in the subsequent drawings, to function as a litter box. Here again, the open end of the plastic bag, expanded and held in place by the flexible sheet, with or without the base tray, provides a simple and convenient litter bag/box.

Figure 6:
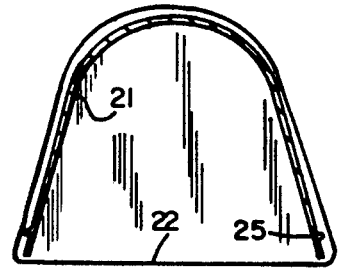
FIG. 6 is a cross section of an end view of the frame of FIG. 5 without the base.

FIG. 6 shows an end view, in cross section, of the device of FIG. 5 without the base tray. Here, the flexible frame 21 may stretch the sides of the plastic bag 22 that is to form the litter box, as shown. Actually, if no base tray were available, as noted, this could function as the actual litter box, with the necessary litter, not shown, spread out on the side of the bag that forms the bottom of the unit. This figure also shows a bead, or projection 25 that can secure this flexible sheet frame within the base 23, as will be seen in FIGS. 7 and 8.

Figure 7:
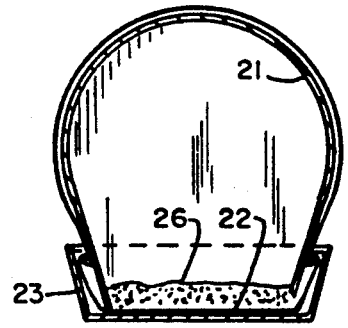
FIG. 7 is a cross section of an end view of the frame secured within the base.

FIG. 7 shows another end view of the same device, also in cross section, with the outer, bottom edges of the flexible sheet further flexed or compressed to fit its outer edges within the base tray 23, as is also seen in FIG. 5. The outer edges of the flexible sheet show the beads or projections to engage the outer edges, or ledges on the inside of the sides of the tray 23 and lock them in place there, as will be seen in more detail in FIG. 8.

FIG. 7 also shows a cross section of the base tray 23, with the litter 26 resting on the plastic 22 along the bottom of the tray 23. The tray, when available, does supply a more-solid base for the relatively-light flexible sheet, and the plastic bag that form the litter box.

Figure 8:
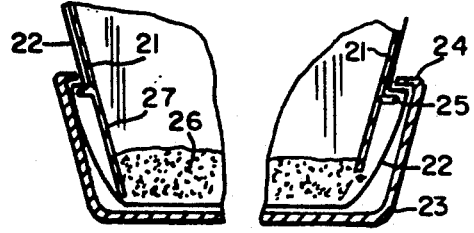
FIG. 8 is an enlarged cross section of portions of the end view of the device secured within the base.

FIG. 8 shows enlarged cross sections of the side sections of portions of end views of this embodiment with ledges 24, on the upper, inner edges of opposing sides of the base tray that engage the beads or projections 25 at the outer edges of the flexible sheet 21 to lock the frame in place by means of the tension of the flexible sheet.

The lower portion of the bag 22 again rests on the bottom of the base tray 23, and is covered with litter 26.

Additional spacers, such as 27, may be provided at the outer edges of the flexible sheet frame, below the projections 25, to hold the frame above the bottom of the base tray and the litter in case the spring pressure of the flexible sheet, or the angle the pressure is applied is not sufficient to hold the projections 25 tightly up in place against the ledges 24. These spacers may be continuous, on either side of the flexible sheet, or may be projections spaced at intervals along the ends of the flexible sheets. In any case it will hold the main portion of the frame above the litter 26 to simplify the cleaning of the frame after each use, or from time to time.

The frame, as shown in FIGS. 1-4, may be of any material rigid enough to support the plastic for the purposes required. Plywood, masonite, or even treated cardboard, or the like, would be suitable. The material would, in fact, protect the plastic from abrasion or damage by the animals. Obviously, the small panels can be hinged or fastened in such a way that they can be folded flat for travel or storage.

The flexible sheet of FIGS. 4-8 may be of metal, plastic, or any springy material. While it must be compressible by hand for inserting in the plastic bag, and in its base 23, it should have enough tension to hold the projections 25 tightly against the ledges 24.

Wire frames, not shown, may also be used, preferably with heavier plastic bags to withstand possible abrasion of animals using the enclosed litter box. These frames, too, can be dismountable for storage, etc.

In operation, the frame can be put into a plastic bag of suitable size and shape, and then seated into, or fastened to a base tray. Conventional liter can be put into the plastic bag along the bottom of the tray to function as a litter box. If the sides of the frame are supported well above the bottom of the tray, the bag may be slipped in place over the frame. When the litter has served its purpose, the frame can be removed from the plastic bag, which can then be discarded, and another plastic litter bag put on the frame.

The plastic bags may be of any size and weight to fit over the frame, and have enough strength to hold the litter and withstand reasonable wear in use and disposal. For some sizes of animals, readily-available plastic shopping bags may be used, and, if more strength is needed, thay can be doubled or tripled.

The base tray 13 or 23 may be of sturdy plastic or metal, of a size and shape adequate to contain the bottom section of the plastic bag and its frame—and the animal, of course. It should have sides high enough to contain the litter, and strong enough to support the frame.

I claim:

1. An enclosed litter box for domestic pets comprising; a disposable plastic bag having one open end; a supporting frame fitting within said plastic bag; said supporting frame forming a top section, a back section, and two side sections within said plastic bag; said supporting frame being open along a bottom section, with a corresponding portion of said plastic bag forming said bottom section; a layer of litter material spread over said portion of said plastic bag forming said bottom section; a front section of said frame being open at said open end of said bag, whereby a domestic animal has access through said open end of said bag to said litter material on said bottom section of said disposable plastic bag.

2. In combination with an enclosed litter box for domestic pets, as in claim 1; an open tray, slightly larger than said bottom section of said enclosed litter box; and means for securing said supporting frame within said open tray, whereby said bottom section of said plastic bag is contained within and supported by said open tray.

3. An enclosed litter box for domestic pets, as in claim 1, wherein said supporting frame is made of rigid panels forming said top section and said two side sections; said back section being covered by a corresponding portion of said plastic bag.

4. An enclosed litter box for domestic pets, as in claim 3, wherein said rigid panels are detachably connected together along their edges, and can be detached for storage.

5. An enclosed litter box for domestic pets, as in claim 1, wherein said supporting frame is formed of rods connected at their ends to define said frame.

6. An enclosed litter box for domestic pets, as in claim 5, wherein said rods are detachably connected to their corners, and can be detached for storage.

7. An enclosed litter box as in claim 1, wherein said supporting frame comprises a flexible sheet that can be curved to form said top and said side sections of said frame to fit within said plastic bag; the straight edges of said sheet being spaced to form said open bottom section; the curved edges of said sheet forming said back section and said front section; said back section being covered by a corresponding portion of said plastic bag; and said front section being open at said open end of said plastic bag.

8. In combination with an enclosed litter box for domestic pets, as in claim 7, an open tray, slightly larger than said bottom section of said frame; said tray having upwardly projecting sides; means for securing said straight edges of said sheet to said upwardly-projecting sides of said open tray, whereby said bottom section of said plastic bag is contained within and supported by said open tray.

* * * * *